United States Patent
Srivastava et al.

(10) Patent No.: US 8,463,768 B2
(45) Date of Patent: *Jun. 11, 2013

(54) METHOD AND APPARATUS FOR USING TAG TOPOLOGY

(75) Inventors: Divesh Srivastava, Summit, NJ (US); Suresh Venkatasubramanian, Salt Lake City, UT (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/620,465

(22) Filed: Sep. 14, 2012

(65) Prior Publication Data

US 2013/0013582 A1  Jan. 10, 2013

Related U.S. Application Data

(63) Continuation of application No. 11/608,142, filed on Dec. 7, 2006, now Pat. No. 8,316,000.

(51) Int. Cl.
*G06F 7/00* (2006.01)
*G06F 17/30* (2006.01)

(52) U.S. Cl.
USPC ............ 707/706; 707/723; 707/724; 707/770

(58) Field of Classification Search
USPC ............ 707/600–831, 899, 999.001–999.206
See application file for complete search history.

(56) References Cited

U.S. PATENT DOCUMENTS

| | | | |
|---|---|---|---|
| 6,470,306 B1 | 10/2002 | Pringle et al. | |
| 6,490,577 B1 | 12/2002 | Anwar | |
| 6,957,213 B1 | 10/2005 | Yuret | |
| 7,082,476 B1 | 7/2006 | Cohen et al. | |
| 7,349,895 B2 | 3/2008 | Liu et al. | |
| 8,316,000 B2 | 11/2012 | Srivastava et al. | |
| 2004/0095374 A1 | 5/2004 | Jojic et al. | |
| 2005/0198056 A1 | 9/2005 | Dumais et al. | |
| 2005/0228788 A1 | 10/2005 | Dahn et al. | |
| 2005/0249080 A1 | 11/2005 | Foote et al. | |
| 2005/0256867 A1 | 11/2005 | Walther et al. | |
| 2006/0112095 A1 | 5/2006 | Xie et al. | |
| 2006/0242135 A1 | 10/2006 | Weare | |
| 2006/0259475 A1 | 11/2006 | Dehlinger | |
| 2007/0136256 A1 | 6/2007 | Kapur et al. | |

OTHER PUBLICATIONS

Dorado, A. et al. "Semi-automatic image annotation using frequent keyword mining," Jul. 2003, IEEE Computer Society, Proceedings of the Seventh International Conference on Information Visualization (IV'03), ISBN 0-7695-1988-1, pp. 532.

PCT International Search Report and Written Opinion for PCT/US2007/085958; Mar. 26, 2008, consists of 14 unnumbered pages.

Reddy, S., et al., "Lifetrak: music in tune with your life", Proceedings of the 1.sub.st ACM International Workshop on Human-Centered Multimedia, Oct. 27, 2006, pp. 25-34.

(Continued)

*Primary Examiner* — Angelica Ruiz

(57) ABSTRACT

A method and apparatus for using tag topology for enhancing search capabilities, e.g., searching over the web, are disclosed. For example, the present method receives a user query contain a search term from a user. The method then generates a search result containing at least one entity, wherein the at least one entity is found based on a plurality of user provided tags that is associated with the at least one entity.

20 Claims, 3 Drawing Sheets

OTHER PUBLICATIONS

Wu, H, et al., "Harvesting social knowledge from folksonomies", Proceedings on the Seventeeth Conference on Hypertext and Hypermedia, Aug. 22, 2006, pp. 111-114.

Wu, X., et al. "Exploring social annotations for the semantic web", Proceedings of the 15.sup.th International Conference on World Wide Web, May 23, 2006, pp. 3 417-426.

Li, X.Q., et al., "Gaussian mixture distance for information retrieval", International Joint Conference on Neural Networks, Jul. 10-16, 1999, pp. 2544-2549.

Wan, X., et al., "The earth mover's distance as a semantic measure for document similarity", Proceedings of the 14.sup.th ACM International Conference on Information and Knowledge Management, Oct. 31, 2005, pp. 301-302.

METHOD AND APPARATUS FOR USING TAG TOPOLOGY

This application is a continuation of U.S. patent application Ser. No. 11/608,142, filed Dec. 7, 2006, which is currently allowed, and is herein incorporated by reference in its entirety.

The present invention relates generally to communication networks and, more particularly, to a method and apparatus for using tag topology for searches in networks such as the Internet.

BACKGROUND OF THE INVENTION

The Internet has emerged as a critical communication infrastructure, carrying traffic for a wide range of important applications. Internet services such as VoIP and SoIP services are becoming ubiquitous and more and more businesses and consumers are relying on their Internet connections for much of their voice and data communications. Businesses and consumers connect their networking devices e.g., computers, routers, etc. to the Internet for sending and receiving data. For example, businesses may build web sites to enable their customers to access information, to make purchases or to subscribe to services, where the web sites can be hosted by a network service provider. The businesses may provide inputs, e.g., key words, to the service provider for use in building an index structure that will assist users in locating information on the web sites. In turn, if a user provides the corresponding key words to a search engine, there will be a good chance that the search result will include the web sites. However, this key word approach in building a web site presumes that the selected key words for the web site are universally agreed upon as being representative of the content contained in the web site. Unfortunately, that is not always the case since different people may categorize the content differently. Furthermore, another deficiency of the key word approach is that it is not a very good measure as to how well the search result actually matched the intent of the user. In fact, web page creators often add misleading tags to increase user traffic to their own web sites or to other web sites based on prearranged financial arrangements. Identifying interesting web pages by browsing, that is, by following links from one web page to another, faces a similar problem. A web page is typically linked to another web page only if the web page creator specifically provided the link. If the web page creator is not aware of other relevant web pages, such links will not be created.

Therefore, there is a need for a method that utilizes tag topology to increase the accuracy of searches to bring about a better experience for the users.

SUMMARY OF THE INVENTION

In one embodiment, the present invention discloses a method and apparatus for using tag topology for enhancing search capabilities, e.g., searching over the web. For example, the method receives a user query contain a search term from a user. The method then generates a search result containing at least one entity, wherein the at least one entity is found based on a plurality of user provided tags that is associated with the at least one entity. The entity may comprise web pages, pictures, blogs, emails and the like that may be tagged by user provided tags. For example, the present method may represent the entities by distributions over their user provided tags. The distributions are then used to construct a tag topological layer. The method then receives queries from users and provides responses based on the tag topology.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
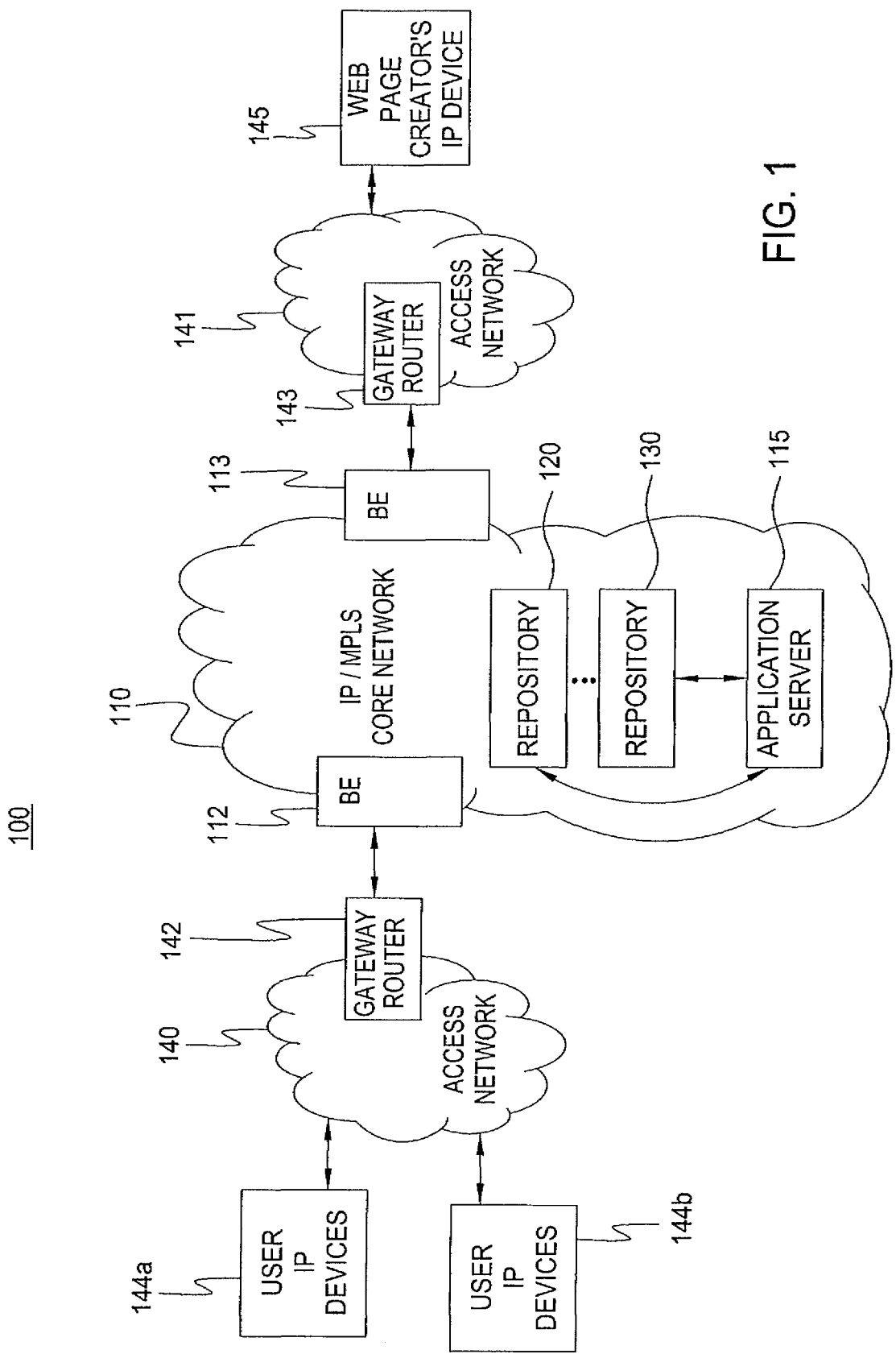
FIG. 1 illustrates an exemplary network with the current invention for using tag topology.

The present invention broadly discloses a method and apparatus for using tag topology to enhance searching capabilities, e.g., on the web. Although the present invention is discussed below in the context of an IP network, the present invention is not so limited. Namely, the present invention can be applied for other networks such as the cellular networks and the like.

Businesses and consumers connect their networking devices e.g., computers, routers, etc. to the Internet for sending and receiving data. For example, businesses may build web sites to enable their customers to access information, to make purchases or to subscribe to services, where the web sites can be hosted by a network service provider. The businesses may provide inputs, e.g., key words, to the service provider for use in building an index structure that will assist users in locating information on the web sites. However, this key word approach in building a web site presumes that the selected key words for the web site are universally agreed upon as being representative of the content contained in the web site. Unfortunately, that is not always the case since different people may categorize the content differently. In fact, web page creators often add misleading meta tags to increase user traffic to their own web sites or to other web sites based on prearranged financial agreements.

The present invention provides a method and apparatus for utilizing tag topology to enhance search capabilities, e.g., on the web. In order to clearly illustrate the teachings of the current invention, the following terminologies and networking concepts will first be described:

web page and HTML tags;
    A web browser; and
    Meta tag.

A web page is a document or file that contains text (and possibly images), and a set of Hyper Text Markup Language (HTML) instructions that tell web browsers how the text may be formatted when it is displayed on a screen. The set of instructions that describe the formatting are called HTML tags. For example, HTML tags instruct the web browser to use a specific font size, color, arrange content in columns or rows, etc. The web browser interprets the HTML tags to determine how to format the text on the screen.

A web browser is a computer program used to access a web server on the Internet and to request a web page. For example, the web browser obtains a web page through a network, interprets the set of HTML tags within the page, and displays the page on a screen. Hence, the text and HTML tags are created by the author of the web page and will be interpreted by the web browser to display the web page on a viewer's screen.

A meta tag is a special HTML tag that provides information about a web page. Unlike normal HTML tags, meta tags do not affect how the page is displayed. Instead, they provide information such as who created the page, how often it is updated, what the page is about, and which keywords represent the page's content. Many search engines use this information when building their indices. It should be noted that meta tags are generated by the creators of the web pages.

When a user sends a query to a search engine, the search engine uses its index structure to locate web pages. For example, if a query includes the term "heart", the result may contain URLs for health related web pages, stationery or card related web pages, candy related web pages, etc. Unfortunately, the user must then manually peruse through the search result and/or reissues another query, and so on. Thus, traditionally methods for generating search results that rely on matching key words generated by web page creators have only provided limited success. Furthermore, traditionally methods for generating search results that attempt to correlate additional pages or links to other pages based on semantic content have provided even more limited success due to the fact that web page creators are often biased in causing search engines to discover their web pages. Therefore, there is a need for a method that uses tags to enhance search results, e.g., to relate web pages based on semantic descriptions.

The present invention provides a method that uses tag topology for enhancing searching capabilities, e.g., searching on the Web. A "tag" is broadly defined as a semantic description (e.g., one or more alphanumeric terms) that is provided by a user and is associated with an entity (e.g., a web page, a blog, a picture, an email and so on). For example, a user may access a web page via a web browser, and is then allowed to enter one or more tags that will be associated with the web page. For example, a web page that contains a news article on various fine wines that are offered at a particular restaurant in New York City may contain the following tags from different users: "wine review", "restaurant review", "restaurant with good wines", "fine dining in NYC", and so on. This example illustrates the diverse perspectives that may exist, where all the perspectives for a particular entity are pertinent and accurate to varying degrees, but they are expressed in very different ways. In other words, the tags will provide additional meanings to the entity, thereby assisting search engines to provide more pertinent search results to users.

In one embodiment, the user provided tags for each entity are stored, e.g., in a public repository such as digg, del.icio.us, flickr, technorati, etc. In another embodiment, the tags can be stored in a public or private repository that is operated and managed by a service provider, e.g., a network service provider or an Internet Service provider (ISP). Thus, the current invention enables a service provider to create a tag topological network layer (as discussed below) that can then be utilized to link entities, e.g., web pages based on the user added tags. Namely, the user created tags provide a rich layer of semantics that will enable a service provider to enhance and extend web search capabilities. The value of tags lies in the consensus opinion of millions of users who tag pages. To the contrary, the traditional Meta tags and links controlled by web page creators may have little relevance if any to the actual content of a web page.

To better understand the present invention, FIG. 1 illustrates an exemplary network 100, e.g., a packet network. Exemplary packet networks include Internet protocol (IP) networks, Asynchronous Transfer Mode (ATM) networks, frame-relay networks, and the like. An IP network is broadly defined as a network that uses Internet Protocol to exchange data packets. Thus, a Voice over Internet Protocol (VoIP) network or a Service over Internet Protocol (SoIP) network is considered an IP network.

FIG. 1 illustrates an exemplary network 100 with the current invention for using tag topology on the web. For example, customers may use IP devices 144a and 144b to obtain Internet access services, e.g., accessing the web to perform one or more searches, accessing VoIP or SoIP services, etc. The IP based customer endpoint devices 144a and 144b may comprise a computer, a laptop, an IP phone, a mobile phone, a personal digital assistant (PDA), and so on. The IP devices 144a and 144b are connected to an access network 140 (e.g., a Local Area Network (LAN), a Digital Subscriber Loop (DSL) or Cable broadband access network, and the like). The access network 140 contains a gateway router 142. The gateway router 142 is connected to an IP/MPLS core network 110 through a border element (BE) 112. The BE resides at the edge of the IP core infrastructure and interfaces with customers endpoints over various types of access networks. A BE is typically implemented as a Media Gateway and performs signaling, media control, security, and call admission control and related functions.

In one illustrative embodiment, a business entity is using an IP device 145 to create one or more web pages that are web accessible. For example, the IP device 145 can be a web server in one embodiment. The IP device 145 is connected to an access network 141 (e.g., a Local Area Network (LAN), a Digital Subscriber Loop (DSL) or Cable broadband access network, and the like). The access network 141 contains a gateway router 143. The gateway router 143 is connected to the IP/MPLS core network 110 through a border element 113. In one embodiment, a service provider utilizes an application server 115 to enable user IP devices 144a and 144b to search for web content based on tag topology. For example, the service provider may utilize repositories 120 and 130 for managing tags provided by users. For example, repository 120 can be a public repository that is operated and managed by a third party, whereas repository 130 can be a private repository that is operated and managed by the service provider itself.

For example, application server 115 may access an entity p that may have been tagged by users. Broadly defined, the entity may be a web page, a picture, a blog entry, an email, etc. The application server then collects tags from one or more repositories for entity p. The entity p may be tagged by many tags. For example, numerous users may have accessed a web page and tagged it using n different tags.

In one embodiment, the application server then defines a tag vector $t_p$ for entity p, where $t_p(i)$ represents a measure of the weight of tag i for entity p In one embodiment, $t_p(i)$ is a normalized count of times tag i is used to tag entity p. In another embodiment, $t_p(i)$ may be based on other measures, e.g., Inverse Document Frequency (IDF) weights, a measure that takes into account browser history that led to a page, etc. In ore embodiment, the present invention defines a dynamic tag vector based on static tag vectors of all pages visited prior to reaching a current page. Similarly, a page vector $p_1$ may be defined for tag t, where $p_t(j)$ represents a measure of the weight of page j for tag t. Each page p is then described by a distribution over tags, and each tag t is described by a distribution over pages.

In one embodiment, the present invention determines a distance between pages as a distance between their tag vectors, and/or a distance between tags as a distance between their page vectors. In one embodiment, the method uses a Kullback-Leibler distance to measure a distance between vectors. Kullback-Leibler distance is used in information theory to obtain inferential distance between two vectors when directed relationships are meaningful. For example, in a browser scenario, it might be important to reach web page p from web page $p_1$ in order to determine the next web page to be visited. In the tag topology of the current invention, the mapping between tags and pages is many-to-many. The Kullback-Leibler distance enables the present method to determine the page to be visited next in a meaningful way. For example, if a user is searching for the word "heart" but reached a particular web page from a cardiac health related site, the next web page should be focused on similar sites and not revert back to providing unrelated web pages e.g., stationary/card web pages.

In another embodiment, the present method uses an earth mover distance as defined by Wasserstein-Kantorovish to determine a distance between vectors. Earth Mover Distance (EMD) is a measure of the amount of effort needed to reshape a vector to look like another vector. EMD is a commonly used measurement for comparing texture and color similarities in images.

In one embodiment, the present method uses the distance between tags to construct a tag topological layer. For example, user provided tags can be evaluated and then used to create links between web pages.

When a query (e.g., converted into a tag vector) is received from a user, browser recommendations are provided to the user based on the tag topology. For example, a search engine with the current invention may return pages that are not based only on matching key words, but are based on the closeness of the search term in the tag layer.

Figure 2:
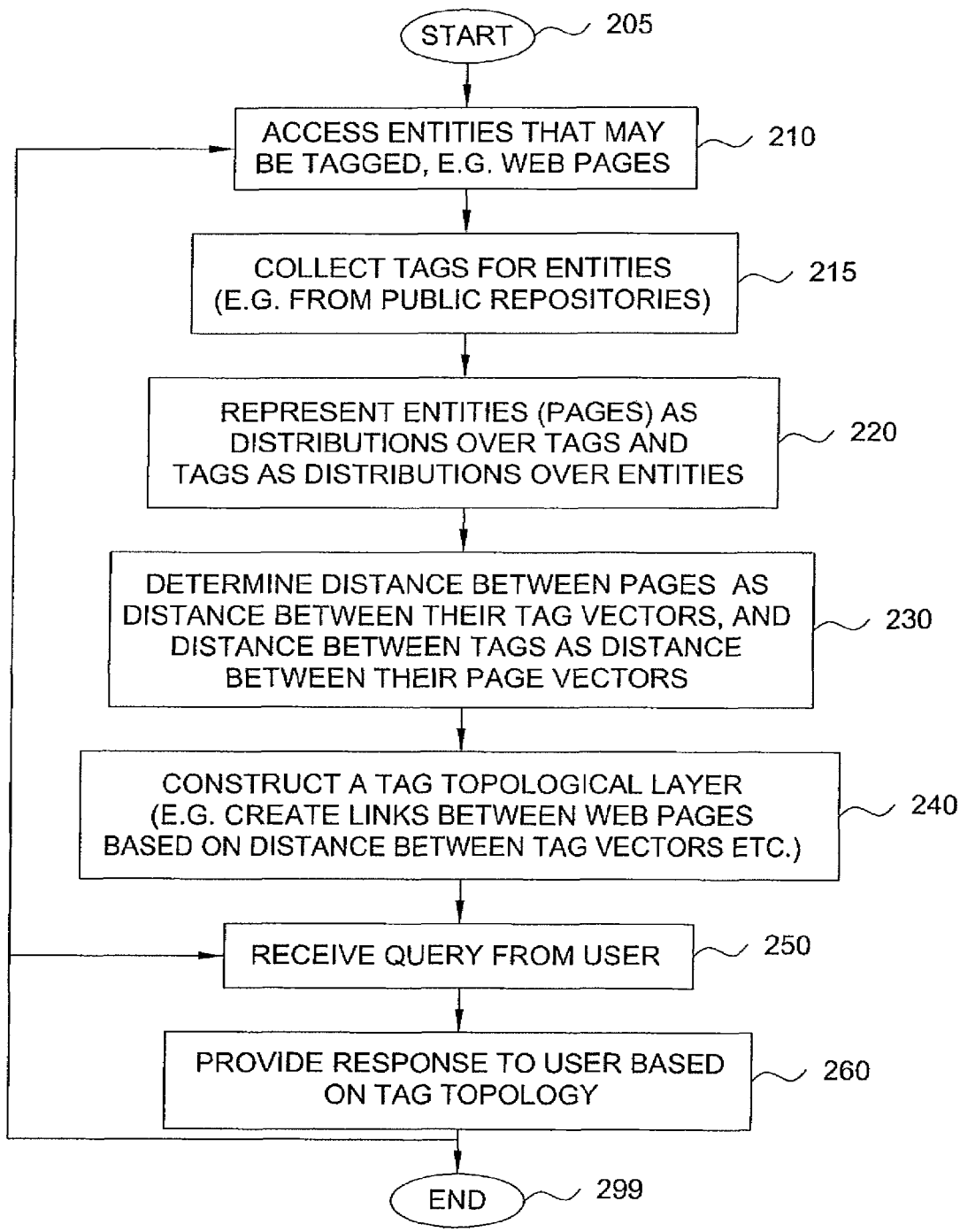
FIG. 2 illustrates a flowchart of a method for using tag topology.

FIG. 2 provides a flowchart of the method 200 for using tag topology to enhance search capabilities. For example, a service provider may enable an application to build a tag topological layer using tags provided by users and enables users to search based on the tag topology.

Method 200 starts in step 205 proceeds to step 210. In step 210, method 200 accesses entities that may be tagged, e.g., web pages, blog entries, pictures, emails, etc. For example, the method may utilize spider software, tag repositories and the like to search for entities that have been tagged. For example, the present method 200 may identify a plurality of web pages that have been tagged by various users.

In step 215, method 200 collects tags from various repositories (public and/or private) for identified entities. For example, an entity such as a web page may be tagged by many different tags in various repositories. The method then proceeds to step 220.

In step 220, method 200 may represent entities by distributions over tags, and/or tags by distributions over entities (web pages, etc). In one embodiment, a tag vector $t_p$ is defined for each entity p, where $t_p(i)$ represents a measure of the weight of tag i for entity p. Similarly, a page vector p, is defined for tag t, where $p_t(j)$ represents a measure of the weight of page j for tag t. Each entity p is then described by a distribution over tags, and/or each tag t is described by a distribution over pages.

In one embodiment, $t_p(i)$ is a normalized count of times tag i is used to tag entity p. In another embodiment, $t_p(i)$ is based on other measures, e.g., Inverse Document Frequency (IDF) weights, a measure that takes into account browser history that led to a page, etc. In one embodiment, the present invention defines a dynamic tag vector based on static tag vectors of all pages visited prior to reaching a current page.

In step 230, method 200 determines a distance between pages as q distance between their tag vectors, and/or a distance between tags as a distance between their page vectors. In one embodiment, the method uses a Kullback-Leibler distance method to measure a distance between vectors by while taking into account browser history. For example, it might be important to reach web page p from web page $p_1$ in order to determine the next web page to be visited. In general, the distance measure between tag vectors is a measure of the link strength between the entities associated with the tag vectors.

In another embodiment, the method uses an earth mover distance as defined by Wasserstein-Kantorovish to determine distance between vectors. Earth Mover Distance (EMD) is a measure of the amount of effort needed to reshape a vector to look like another vector.

In step 240, method 200 optionally constructs a tag topological layer using the distance between pages and/or distance between tags. For example, the method may create links between web pages using the user provided tags.

In step 250, method 200 receives a query from a user. For example, a user may use a browser to submit a query for a search, e.g., providing one or more key words (e.g., broadly a search term). It should be noted that the query from the user can be converted into one or more vector tags. In another example, a user may be viewing a current web page and requests for other pages based on similarity on a tag layer. Namely, the user need not provide a new key word or start a new search, but simply submits a request for similar entities based on a tag topology, e.g., selecting an icon on the browser or selecting an icon displayed along with the previous search result. Thus, the present invention can be implemented as an enhancement to search engines or as a service feature provided by a service provider.

It should be noted that the present invention can be implemented with existing search methodology. For example, the user may initially perform a search that is based on traditional key words searches. Upon reaching a web page using the traditional approach, the user can then be provided an opportunity (e.g., via an icon on the displayed result) to request similar pages based on tag space (i.e., based on the tag layer). This additional search capability can be provided as an added service feature that a service charge may be assessed against the user or free of charge if the user is a subscriber of the service provider.

In step 260, method 200 provides a response to the user based on the tag topology. For example, a search engine with the current invention may return pages that are not based only on matching key words, but are based on the closeness of the search term in the tag layer, e.g., closeness between the entities with respect to each other based indirectly on the search term and/or closeness of the entities to the search term directly. The method then proceeds to step 299 to end the current query. Alternatively, the method may return to step 250 to continue receiving more queries, or to step 210 to continue accessing more web pages that may be tagged.

Figure 3:
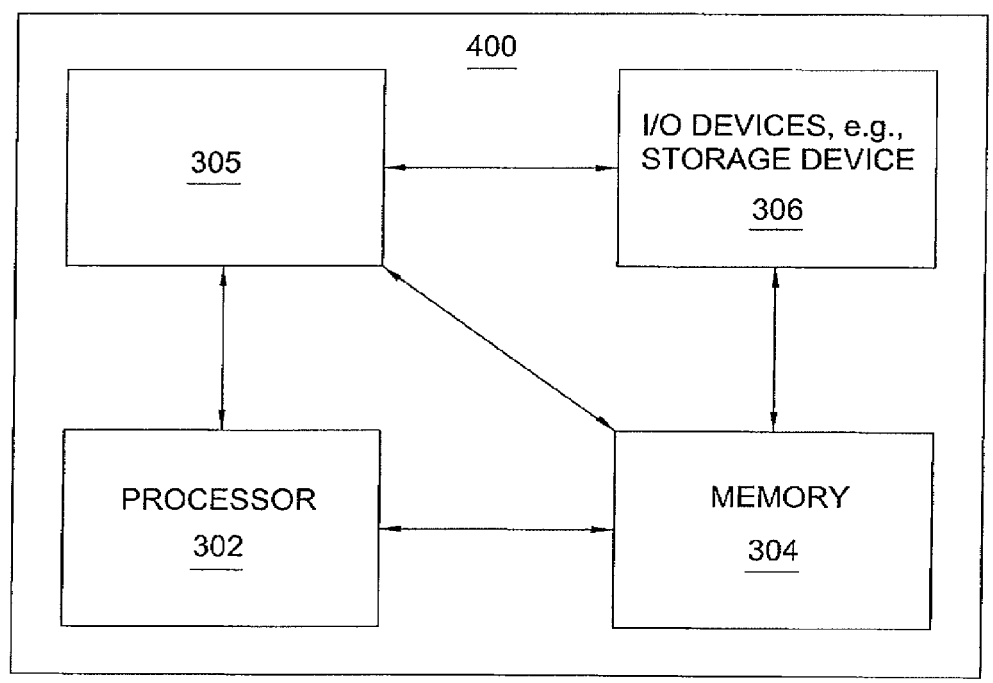
FIG. 3 illustrates a high-level block diagram of a general-purpose computer suitable for use in performing the functions described herein.

FIG. 3 depicts a high-level block diagram of a general-purpose computer suitable for use in performing the functions described herein. As depicted in FIG. 3, the system 300 comprises a processor element 302 (e.g., a CPU), a memory 304, e.g., random access memory (RAM) and/or read only memory (ROM), a module 305 for using tag topology, and various input/output devices 306 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 305 for using tag topology can be loaded into memory 304 and executed by processor 302 to implement the functions as discussed above. As such, the present method 305 for using tag topology (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for using user provided tags for searching, comprising:
    collecting, by an application server, a plurality of user provided tags associated with a plurality of entities, wherein the plurality of user provided tags comprises semantic descriptions entered by a plurality of different users;
    creating, by the application server, a tag topological network layer that is managed by a service provider, wherein the tag topological network layer predefines a next entity for each one of the plurality of entities based upon the plurality of user provided tags;
    receiving, by the application server, a user query that contains a search term; and
    generating, by the application server, a search result containing an entity of the plurality of entities in the tag topological network layer, wherein the entity is found based on a distance measure of a tag vector, $t_p$, for the entity, p, wherein a function $t_p(i)$ represents a measure of a weight of a tag, i, that is used to tag the entity, p, based on a normalized count of times tag, i, is used to tag the entity, p, wherein the entity contains a link to another entity in accordance with the tag topological network layer, wherein the link is created in accordance with the tag vector of the entity.

2. The method of claim 1, wherein the generating the search result comprises:
    converting the search term into a tag vector, wherein the entity is found based on a distance measure of the tag vector of the entity to the tag vector of the search term.

3. The method of claim 2, wherein the distance measure is a Kullback-Leibler distance measure.

4. The method of claim 2, wherein the distance measure is an earth mover distance measure.

5. The method of claim 1, wherein the entity comprises a web page.

6. The method of claim 1, wherein the tag vector of the entity comprises a distribution of the plurality of user provided tags provided by the plurality of different users.

7. The method of claim 1, wherein the entity is accessible via an internet.

8. The method of claim 1, wherein the search result is provided to the user as a service feature.

9. The method of claim 8, wherein a charge is assessed against the user for providing the search result.

10. A tangible computer-readable storage medium storing a plurality of instructions which, when executed by a processor, cause the processor to perform operations for using user provided tags for searching, the operations comprising:
    collecting, by an application server, a plurality of user provided tags associated with a plurality of entities, wherein the plurality of user provided tags comprises semantic descriptions entered by a plurality of different users;
    creating, by the application server, a tag topological network layer that is managed by a service provider, wherein the tag topological network layer predefines a next entity for each one of the plurality of entities based upon the plurality of user provided tags;
    receiving, by the application server, a user query that contains a search term; and
    generating, by the application server, a search result containing an entity of the plurality of entities in the tag topological network layer, wherein the entity is found based on a distance measure of a tag vector, $t_p$, for the entity, p, wherein a function $t_p(i)$ represents a measure of a weight of a tag, i, that is used to tag the entity, p, based on a normalized count of times tag, i, is used to tag the entity, p, wherein the entity contains a link to another entity in accordance with the tag topological network layer, wherein the link is created in accordance with the tag vector of the entity.

11. The tangible computer-readable storage medium of claim 10, wherein the generating the search result comprises:
    converting the search term into a tag vector, wherein the entity is found based on a distance measure of the tag vector of the entity to the tag vector of the search term.

12. The tangible computer-readable storage medium of claim 11, wherein the distance measure is a Kuilback-Leibler distance measure.

13. The tangible computer-readable storage medium of claim 10, wherein the distance measure is an earth mover distance measure.

14. The tangible computer-readable storage medium of claim 10, wherein the entity comprises a web page.

15. The tangible computer-readable storage medium of claim 10, wherein the tag vector of the entity comprises a distribution of the plurality of user provided tags provided by the plurality of different users.

16. The tangible computer-readable storage medium of claim 10, wherein the entity is accessible via an internet.

17. The tangible computer-readable storage medium of claim 10, wherein the search result is provided to the user as a service feature.

18. An apparatus for using user provided tags for searching, comprising:
    a processor; and
    a computer-readable medium storing a plurality of instructions which, when executed by a processor, cause the processor to perform operations, the operations comprising:
        collecting, by an application server, a plurality of user provided tags associated with a plurality of entities, wherein the plurality of user provided tags comprises semantic descriptions entered by a plurality of different users;
        creating, by the application server, a tag topological network layer that is managed by a service provider, wherein the tag topological network layer predefines a next entity for each one of the plurality of entities based upon the plurality of user provided tags;
        receiving, by the application server, a user query that contains a search term; and
        generating, by the application server, a search result containing an entity of the plurality of entities in the tag topological network layer, wherein the entity is found based on a distance measure of a tag vector, $t_p$, for the entity, p, wherein a function $t_p(i)$ represents a measure of a weight of a tag, i, that is used to tag the entity, p, based on a normalized count of times tag, i, is used to tag the entity, p, wherein the entity contains a link to another entity in accordance with the tag topological network layer, wherein the link is created in accordance with the tag vector of the entity.

19. The apparatus of claim 18, wherein the generating the search result comprises:
converting the search term into a tag vector, wherein the entity is found based on a distance measure of the tag vector of the entity to the tag vector of the search term.

20. The apparatus of claim 19, wherein the distance measure is a Kullback-Leibler distance measure.

* * * * *